United States Patent
Bohn et al.

[11] Patent Number: 5,944,340
[45] Date of Patent: Aug. 31, 1999

[54] AIRBAG MODULE FOR PASSENGER SEAT

[75] Inventors: Stefan Bohn, Goldbach; Willi Wissel, Mömbris, both of Germany

[73] Assignee: MST Automotive GmbH, Aschaffenburg, Germany

[21] Appl. No.: 08/842,128

[22] Filed: Apr. 23, 1997

[30] Foreign Application Priority Data

Apr. 27, 1996 [DE] Germany ............ 196 16 940

[51] Int. Cl.⁶ ........................... B60R 21/16
[52] U.S. Cl. ................ 280/728.2; 280/732
[58] Field of Search .............. 280/728.2, 732

[56] References Cited

U.S. PATENT DOCUMENTS

| | | | |
|---|---|---|---|
| 5,069,480 | 12/1991 | Good | 280/732 |
| 5,257,815 | 11/1993 | Bachelder et al. | 280/728.2 |
| 5,458,364 | 10/1995 | Mueller et al. | 280/728.2 |
| 5,468,012 | 11/1995 | Mihm | 280/728.2 |
| 5,498,024 | 3/1996 | Caruso, Jr. et al. | 280/732 |
| 5,503,425 | 4/1996 | Emambakhsh et al. | 280/728.3 |
| 5,511,819 | 4/1996 | Spilker et al. | 280/728.2 |

FOREIGN PATENT DOCUMENTS

| | | |
|---|---|---|
| 0 620 139 | 3/1994 | European Pat. Off. |
| 4134673 | 4/1993 | Germany |
| 44 33 014 | 3/1995 | Germany |
| 19514336 | 10/1995 | Germany |
| 19602471 | 7/1996 | Germany |
| A 5 193 432 | 8/1993 | Japan |
| A 5 82 710 | 11/1993 | Japan |
| A 8 48 203 | 2/1996 | Japan |

*Primary Examiner*—Kenneth R. Rice
*Attorney, Agent, or Firm*—Sprung Kramer Schaefer & Briscoe

[57] ABSTRACT

The invention concerns an airbag module for the passenger seat in a motor vehicle. The module is characterized by a cylindrical compressed-gas reservoir (1), a tube (2) that encloses the reservoir (1) and has gas-outlet openings (3) distributed along it, two lateral components (4) that are stamped out of sheetmetal and can be forced together along with the tube (2) by the compressed-gas reservoir (1), and an air sack (5) that is provided with a section enclosing the tube (2), that is secured to the tube (2) by means similar to tensioning straps, and that is folded over the tube (2).

10 Claims, 5 Drawing Sheets

AIRBAG MODULE FOR PASSENGER SEAT

BACKGROUND OF THE INVENTION

The present invention concerns an airbag module for the passenger seat in a motor vehicle.

Airbag modules for passenger seats in motor vehicles are increasingly being offered for sale as options and even as original equipment by the automotive industry. Considerable efforts are on the other hand being made to rationalize the manufacture of automobiles in order to remain internationally competitive. This means that accessory passenger-seat airbags must be provided as cheaply as possible.

The result is that an assembly of the aforementioned genus must be designed as ideally as possible from the aspects of materials, manufacture, and installation.

SUMMARY OF THE INVENTION

This object is attained in accordance with the present invention by an airbag module of the aforesaid genus characterized by a cylindrical compressed-gas reservoir, a tube that encloses the reservoir and has outlet openings distributed along it, two lateral components of sheetmetal that can be tensioned along with the tube by the compressed-gas reservoir, and an air sack with a section that encloses the tube, is secured to the tube by means similar to tensioning straps, and that is folded over the tube.

The present invention derives from the realization that such modules do not require a completely closed housing and that the compressed-gas reservoir itself can participate to a more considerable extent than has previously been supposed in providing a passenger-side airbag with dimensional stability.

All that is needed to install and secure the folded air sack are a tube to enclose the compressed-gas reservoir and two lateral components that can be tensioned together along with the reservoir into a single assembly. Such an assembly will need no longitudinal walls because the folded air sack is itself dimensionally stable enough. The air sack can be protected by a cover while being shipped and installed. Such a cover, however, is by no means always necessary and represents only a practical advanced version of the present invention.

Aside from the compressed-gas reservoir and the air sack accordingly, only the tube and the two lateral component are necessary, and the reservoir can be simultaneously exploited as a means of applying tension.

The lateral component can be simple punched and stamped sheetmetal sections that are easy to adapt to any desired requirement. It can for example be of advantage for the lateral components to have round and cup-shaped areas shaped into them that allow them to fit into the tube. The bases of the tube accordingly constitute, in conjunction with areas of the sheetmetal that extend out of the cup-shaped areas and into the plane of origin, a secure and dimensionally stable association between the tube and the lateral components. It will also be practical for the compressed-gas reservoir, the tube, and the lateral components to be provided with elements that ensure angularly precise alignment so that a dimensionally stable assembly can be produced with only one tensioning means, which includes the compressed-gas reservoir.

Advantageous modifications and embodiments of the present invention are disclosed herein One embodiment of the present invention will now be specified with reference to the accompanying drawing, wherein

DETAILED DESCRIPTION OF THE INVENTION

Figure 1:
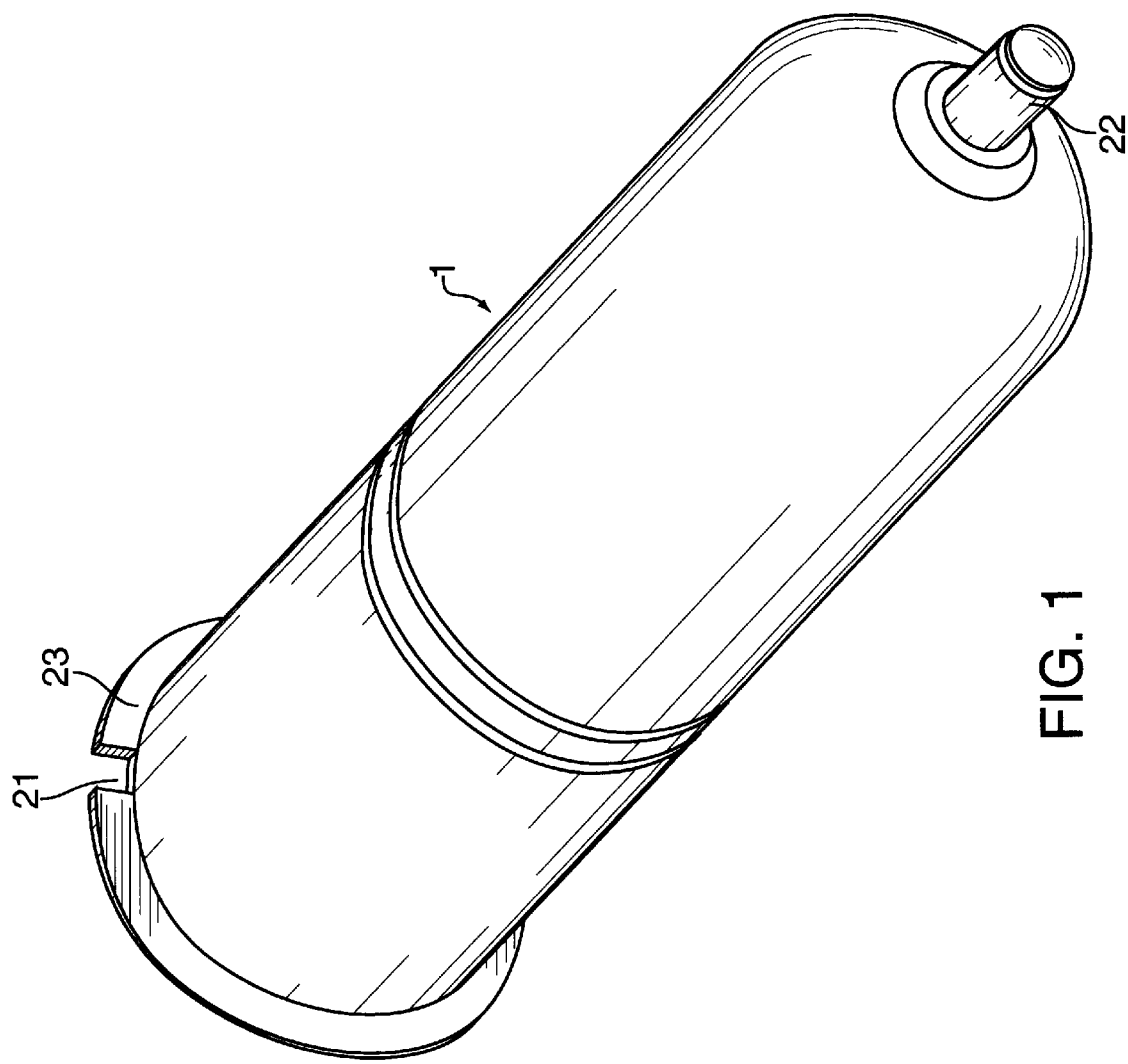
FIG. 1 is a perspective view of a compressed-gas reservoir.

The compressed-gas reservoir 1 illustrated in FIG. 1 has a threaded connector 22 at the top and a projecting flange 23 at the bottom. Flange 23 has a narrow bevel 21 that engages a cutout 20 in a lateral component 4 (FIG. 3), maintaining the correct angle between compressed-gas reservoir 1 and the lateral component.

Figure 2:
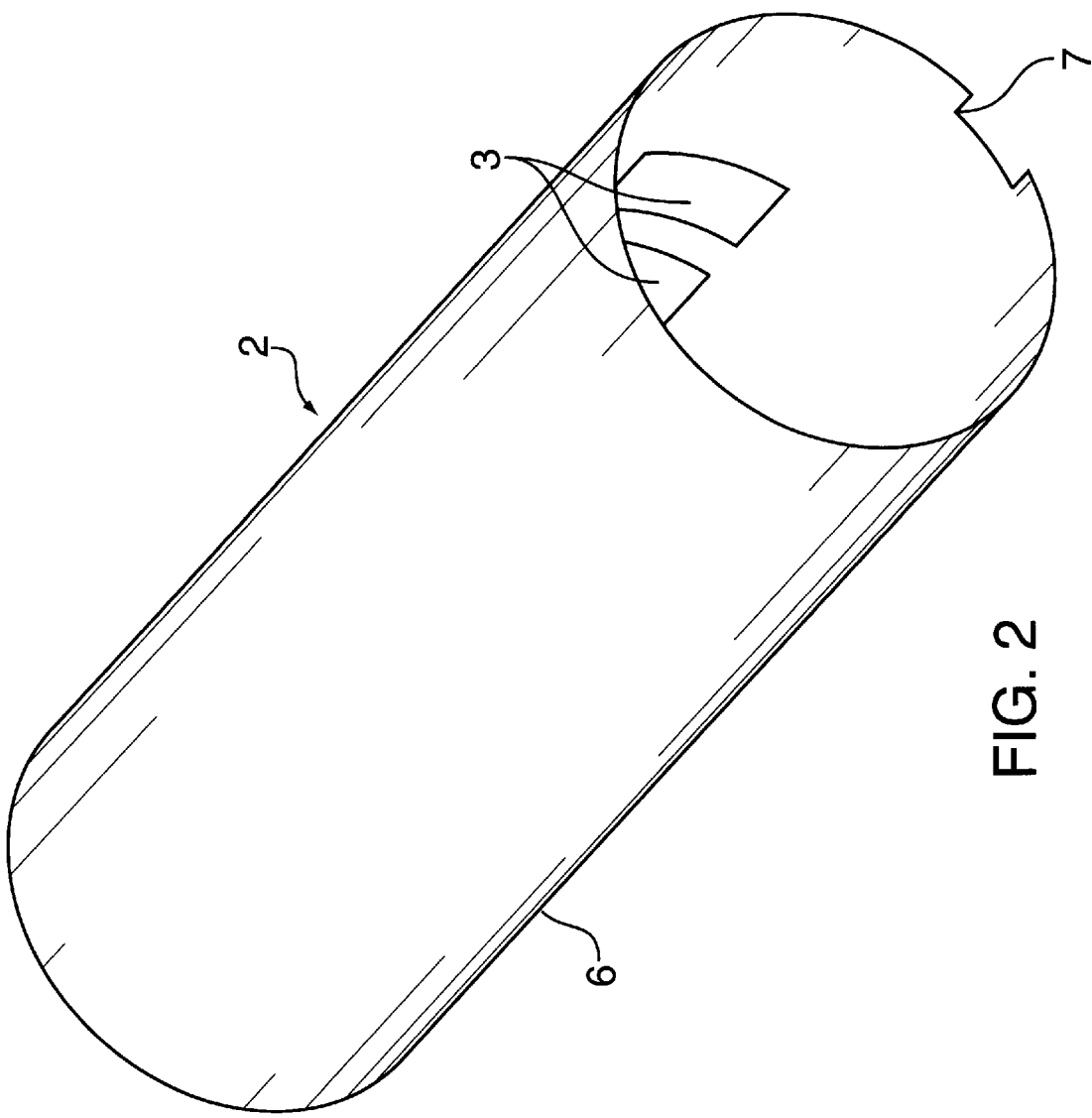
FIG. 2 illustrates an associated gas-distributing tube.

FIG. 2 illustrates a tube 2 that accommodates compressed-gas reservoir 1. Distributed along tube 2 are outlet openings 3 for the gas that is suddenly released when the air sack is actuated, slightly constricting the flow of gas and evenly distributing it to the air sack over the total cross-section of its intake. Tube 2 has a cutout 6 and 7 at each end. Cutouts 6 and 7 operate in conjunction with radially outward projecting structures 11 and 12 in the cup-shaped areas 14 and 15 of lateral components 4 (FIG. 3) and maintain the components at the correct angle to tube 1.

Figure 3:
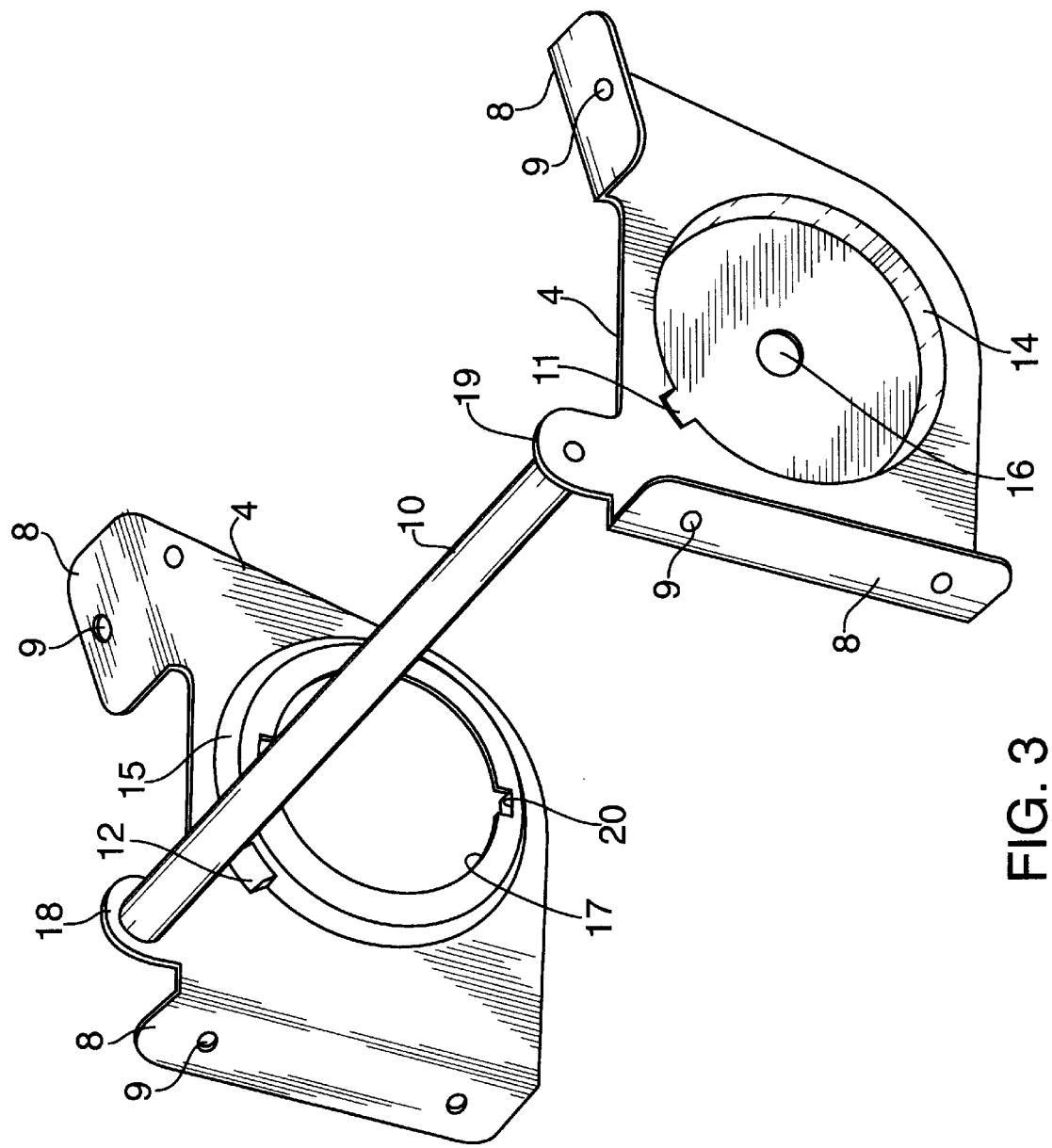
FIG. 3 illustrates two lateral components attached together by an auxiliary tube.

FIG. 3 illustrates two lateral components 4 that have been produced in an appropriate shape by stamping and punching them out of sheetmetal. Components 4 are fastened together by an auxiliary tube 10 (or auxiliary rod). Round and cup-shaped areas 14 and 15 that extend inward, toward the accommodating tub, that is, have been produced by cutting and shaping. Cup-shaped areas 14 and 15 allow lateral components 4 to fit radially tight into tube 1. Cup-shaped areas 14 and 15 are also provided with radially outward projecting structures 11 and 12 that allow lateral components 4 to engage cutouts 6 and 7 at the ends of tube 1 (FIG. 2) and maintain them at the correct angle to each other. Also provided in lateral components 4 are cutouts 16 and 17. The diameter of each cutout 16 and 17 matches that of compressed-gas reservoir 1 or its threaded connector 22 (FIG. 1). The purpose of cutout 20 is, as has been heretofore specified, to maintain, in conjunction with the narrow bevel 21 in the flange 22 on compressed-gas reservoir 1 (FIG. 1), the correct angle between the reservoir and lateral components 4.

There are also other bevels 8 and bores 9 in lateral component 4 for securing the airbag module in the vehicle. Furthermore, lateral components 4 have extensions 18 and 19 for securing an auxiliary tube 10. Auxiliary tube 10 is needed for attaching an (unillustrated) airbag-module cap and optionally for augmenting the tension exerted on the components by compressed-gas reservoir 1.

Figure 4:
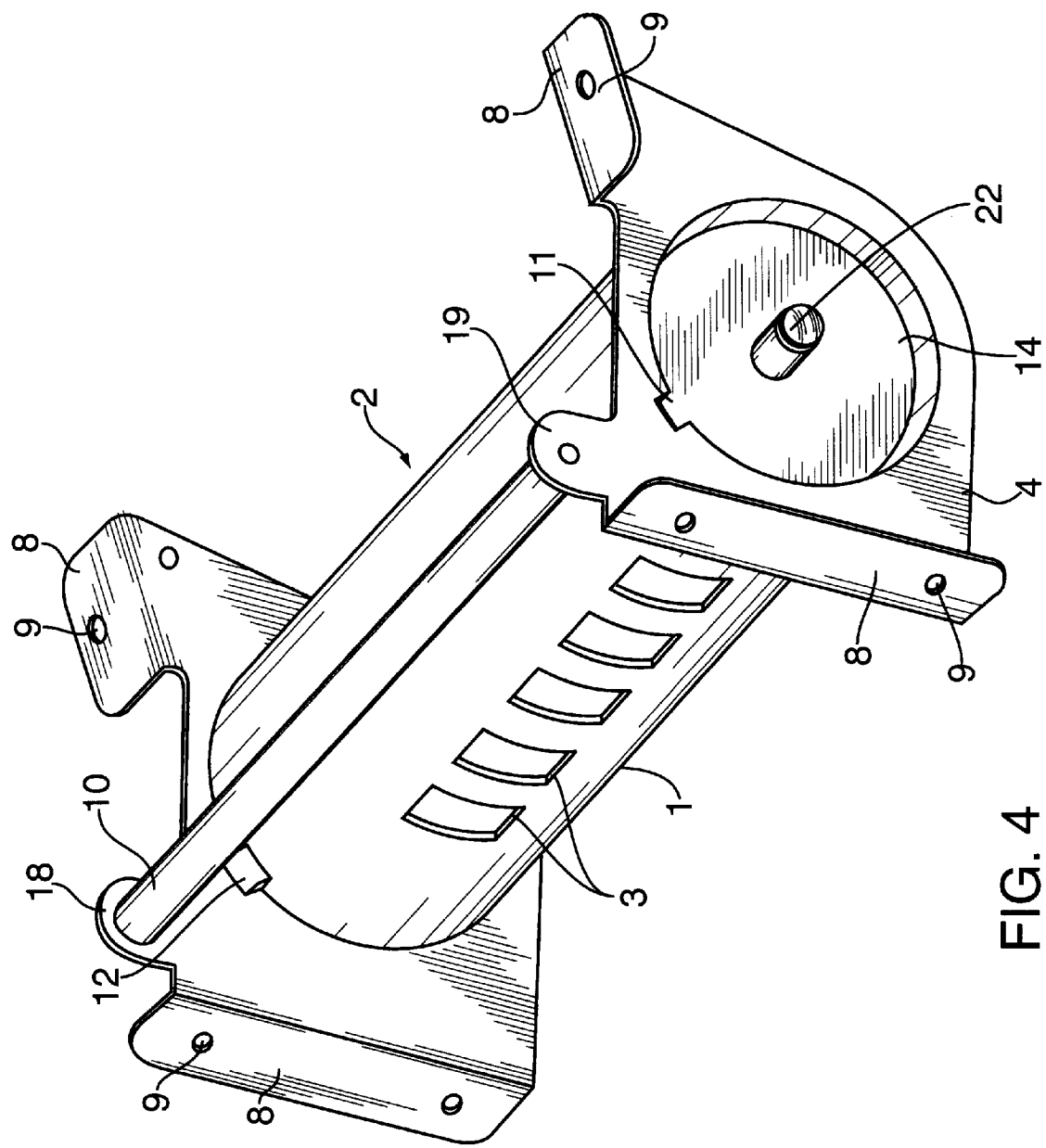
FIG. 4 illustrates an assembly composed of the components illustrated in FIGS. 1 through 3.

FIG. 4 illustrates the components illustrated in FIGS. 1 through 3 assembled but with no nut on threaded connector 22. The illustration is comprehensible in itself and will not be discussed herein.

Figure 5:
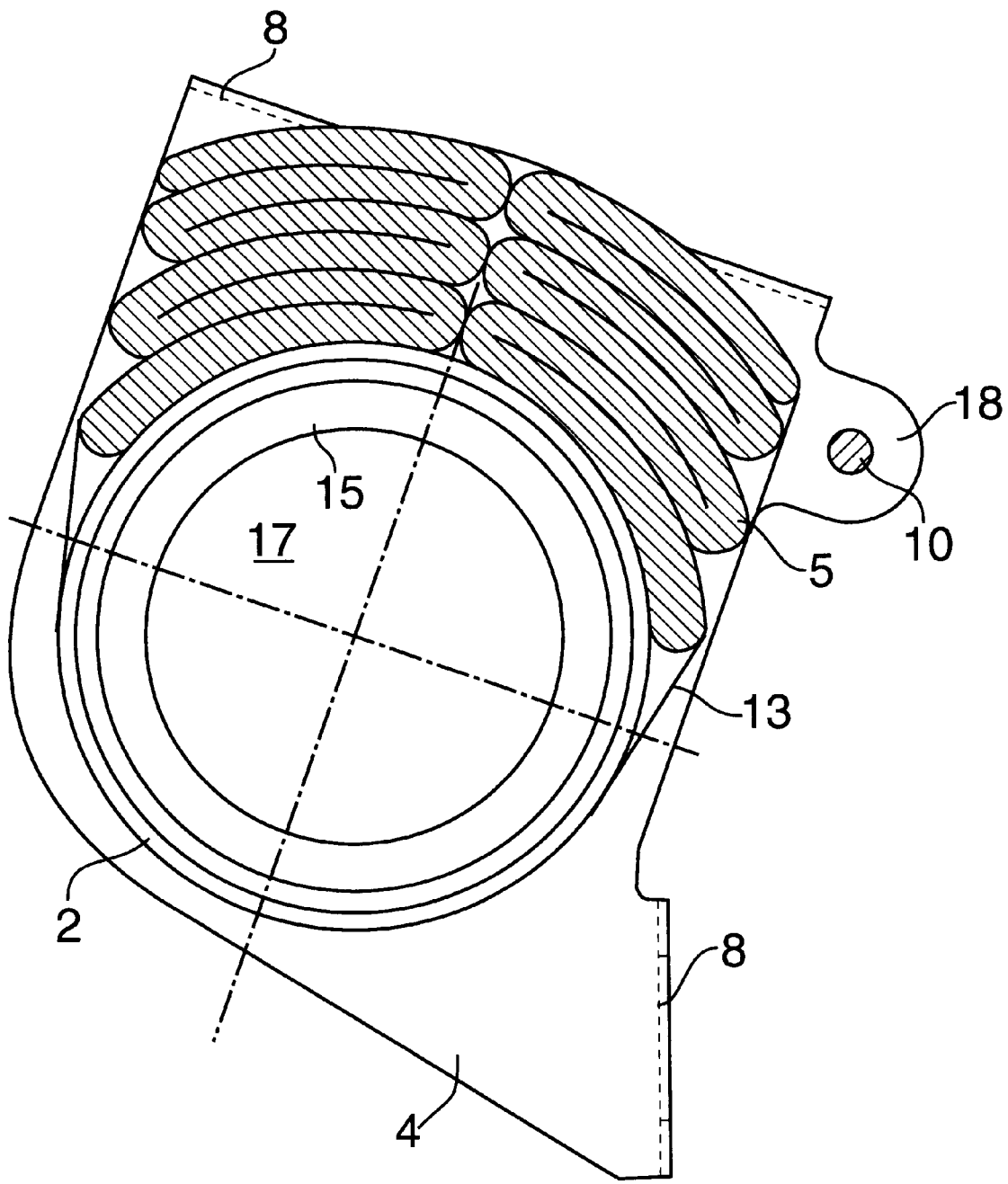
FIG. 5 is a section through an airbag module without a compressed-gas reservoir.

FIG. 5, finally, is a transverse section through the assembly illustrated in FIG. 4 without compressed-gas reservoir 1 but with a folded air sack 5 and a protective cover 13. The latter will not be necessary if folded air sack 5 is inherently dimensionally stable enough. Such stability can easily be ensured by cementing the sack at various points that will not prevent it from unfolding in an emergency. Evident in the overhead view are one lateral component 4 with an extension 18 for securing an auxiliary tube 10 (or auxiliary rod) for attaching a pivoting lid. Also evident are a cup-shaped area 15 with a cutout 17 and bevels 8, whereby the diameter of cutout 17 equals that of the (unillustrated) compressed-gas reservoir 1.

The airbag in accordance with the present invention has few and easily produced components. It can be cost-effectively manufactured and is easy to install, whereby bevels 8 and bores 9 can easily be adapted to various installment situations. Compressed-gas reservoir 1 is exploited as a tensioning device for attaching lateral components 4 to tube 2. Only a single screw will be needed to combine all the components with the exception of air sack 5 into a single assembly. Air sack 5 itself can be secured to tube 2 in a known way by means similar to tensioning straps.

We claim:

1. An airbag module for the passenger seat in a motor vehicle, comprising: a cylindrical compressed-gas reservoir, a tube enclosing the reservoir, and having gas-outlet openings distributed therealong, two lateral components stamped out of sheet-metal and fastened and forced together along with the tube using the compressed-gas reservoir and an air sack folded over the tube and having a section enclosing the tube.

2. The airbag module according to claim 1, wherein the air sack is secured to the tube with tensioning straps.

3. The airbag module as in claim 1, wherein the air sack is secured by being clamped between the tube and the lateral components.

4. The airbag module as in claim 1, wherein the lateral components have round and cup-shaped areas shaped into them that allow them to fit into the tube.

5. The airbag module as in claim 4, wherein the cup-shaped areas are provided with cutouts for securing the compressed-gas reservoir.

6. The airbag module as in claim 4, wherein the lateral components are provided with at least one structure that projects radially out beyond the cup-shaped areas to engage matching cutouts in the tube and maintain a correct angle between the tube and the lateral components.

7. The airbag module as in claim 4, wherein at least one lateral component has a cutout in the cup-shaped areas that cooperates with a matching bevel of similar structure on the compressed-gas reservoir to maintain a correct angle between the tube and the lateral component.

8. The airbag module as in claim 1, wherein the lateral components are provided with structures for securing the module in the interior of a vehicle.

9. The airbag module as in claim 8, wherein the lateral components are configured to secure an auxiliary tube above the folded air sack and axially paralleling the tube and to which a cap for the module is secured by a rebound strap.

10. The airbag module as in claim 1, further comprising a protective cover.

* * * * *